United States Patent
Kaertner et al.

(10) Patent No.: US 10,212,796 B2
(45) Date of Patent: Feb. 19, 2019

(54) X-RAY PULSE SOURCE AND METHOD FOR GENERATING X-RAY PULSES

(71) Applicant: Deutsches Elektronen-Synchrotron DESY, Hamburg (DE)

(72) Inventors: Franz X. Kaertner, Hamburg (DE); Arya Fallahi, Hamburg (DE)

(73) Assignee: DEUTSCHES ELEKTRONEN-SYNCHROTRON DESY, Hamburg (DE)

( * ) Notice: Subject to any disclaimer, the term of this patent is extended or adjusted under 35 U.S.C. 154(b) by 400 days.

(21) Appl. No.: 15/050,514

(22) Filed: Feb. 23, 2016

(65) Prior Publication Data

US 2016/0323985 A1 Nov. 3, 2016

(30) Foreign Application Priority Data

Apr. 30, 2015 (EP) .................................... 15001303

(51) Int. Cl.
*H05G 2/00* (2006.01)
*H05H 9/02* (2006.01)
(Continued)

(52) U.S. Cl.
CPC ............... *H05G 2/008* (2013.01); *H05G 2/00* (2013.01); *H05H 9/02* (2013.01); *H01S 3/0903* (2013.01);
(Continued)

(58) Field of Classification Search
CPC .... H01S 3/0903; H01S 3/0057; H01S 3/0959; H01S 3/005; H01S 3/0092;
(Continued)

(56) References Cited

U.S. PATENT DOCUMENTS 5,150,192 A 9/1992 Greene et al.
7,382,861 B2 6/2008 Madey et al.
(Continued)

OTHER PUBLICATIONS

Bacci et al.,"Compact X-ray free-electron laser based on an optical undulator", Science Direct, Nuclear Instruments and Methods in Physics Research A 587 (2008) pp. 388-397.
(Continued)

*Primary Examiner* — Irakli Kiknadze
(74) *Attorney, Agent, or Firm* — Caesar Rivise, PC

(57) ABSTRACT

X-ray pulse source (100) for generating X-ray pulses (1) includes electron pulse source device (10) including photo-emitter device (11) being configured for photo-induced creation of free electron pulses (2) and driver device (12) being configured for creating electromagnetic driver pulses (3) accelerating electron pulses (2) along acceleration path (7), and electromagnetic interaction device (50) comprising electromagnetic pulse source device (51) being configured for creating electromagnetic pulses (4) in interaction section (5) of electromagnetic interaction device (50), wherein electron pulse source device (10) and electromagnetic interaction device (50) are operable for generating X-ray pulses (1) by an interaction of electron pulses (2) and electromagnetic pulses (4), and driver device (12) includes THz driver pulse source (13), which is configured for creating single cycle or multi cycle THz driver pulses (3). Furthermore, a method of creating X-ray pulses (1) is described.

15 Claims, 1 Drawing Sheet

(51) Int. Cl.
  *H05H 7/04* (2006.01)
  *H05H 7/02* (2006.01)
  *H01S 3/09* (2006.01)
(52) U.S. Cl.
  CPC . *H05H 2007/027* (2013.01); *H05H 2007/041* (2013.01)
(58) Field of Classification Search
  CPC ...... H01S 3/08059; H01S 3/1392; H01S 4/00; H05G 2/00; H05G 2/008; H05H 2007/027; H05H 2007/041; H05H 9/02; H05H 7/18; H05H 9/00; H05H 1/0012; H01J 35/02; H01J 25/02; G01J 3/42; G01J 5/0853; G01J 5/40; G01N 21/3563; G01N 21/3581; G01N 2021/1787; H01L 27/1446; H01L 27/14649; A61N 2005/066; A61N 5/0616; G01B 11/2518; G02B 13/005; G02B 26/105; G02B 27/1006; G21K 1/08; G21K 1/06; G21K 2201/062; G02F 1/3511; G02F 2001/3528; H04K 3/60; H04K 3/825; A61B 5/1074
  USPC .......................................... 378/119, 106, 145
  See application file for complete search history.

(56) References Cited

U.S. PATENT DOCUMENTS

| | | | |
|---|---|---|---|
| 2010/0072405 A1* | 3/2010 | Yu | H01J 25/02 250/493.1 |
| 2012/0288065 A1 | 11/2012 | Graves et al. | |
| 2014/0299782 A1 | 10/2014 | Seryi | |
| 2014/0314114 A1* | 10/2014 | Almasi | H05G 2/00 372/74 |
| 2014/0334607 A1* | 11/2014 | Lopez | G21K 1/06 378/145 |

OTHER PUBLICATIONS

Bacci et al., "Transverse effects in the production of x rays with a free-electron laser based on an optical undulator", Physical Review Special Topics—Accelerators and Beams, vol. 9, No. 6 (2006): 060704.
Bormann et al., "Tip-enhanced strong-field photoemission" in "Physical Review Letters" vol. 105, No. 14 (2010): 147601.
Chang et al., "High-Gain Thompson-Scattering X-Ray Free-Electron Laser by Time-Synchronic Laterally Tilted Optical Wave" in Physical Review Letters, vol. 10, No. 6 (2013):064802.
Chen et al., "MeV-Energy X Rays from Inverse Compton Scattering with Laser-Wakefield Accelerated Electrons" in Physical Review Letters, vol. 110, No. 15 (2013): 155003.
Dombi et al., "Ultrafast strong-field photoemission from plasmonic nanoparticles", Nano Letters, vol. 13, No. 2 (2013): 674-678.
Esarey et al., "Nonlinear Thomson scattering of intense laser pulses from beams and plasmas", in "Physical Review" vol. E 48, No. 4 (1993): 3003-3021.
Fueloep et al., "Efficient generation of THz pulses with 0.4 mJ energy", Optics Express, vol. 22, No. 17, Aug. 25, 2014 (Aug. 25, 2014), pp. 20155-20163, DOI: 10.1364/OE.22.020155.
Gallardo et al., "Theory of a free-electron laser with a Gaussian optical undulator" in "IEEE Journal of Quantum Electronics", vol. 24, No. 8 (1988):1557-1566.
Gea-Banacloche et al., "Proposal for a compact FEL with electromagnetic-wave undulator" in "Nuclear Instruments and Methods in Physics Research" Section A: Accelerators, Spectrometers, Detectors and Associated Equipment 272, No. 1 (1988): 199-205.
Gea-Banacloche et al., "Soft x-ray free-electron laser with a laser undulator" in "IEEE Journal of Quantum Electronics", vol. QE-23, No. 9 (1987): 1558-1570.
Graves et al., "Compact x-ray source based on burst-mode inverse Compton scattering at 100 kHz", Physical Review Special Topics—Accelerators and Beams 17 (2014), pp. 120701-1-120701-24, DOI: 10.1103/PhysRevSTAB.17.120701.
Graves et al., "Intense Superradiant X rays from a Compact Source using a Nanocathode Array and Emittance Exchange" in "Physical Review Letters", vol. 108, No. 26 (2012): 263904-1-263904-5.
Gruener et al., "Design considerations for table-top, laser-based VUV and X-ray free electron lasers" in "Applied Physics B", vol. B 86, No. 3 (2007): 431-435.
Hobbs et al., "High-yield, ultrafast, surface plasmon-enhanced, Au nanorod optical field electron emitter arrays", in "ACS nano", vol. 8 (11), pp. 11474-11482 (2014).
Hommelhoff et al., "Field emission tip as a nanometer source of free electron femtosecond pulses" in "Physical Review Letters" vol. 96, No. 7 (2006): 077401-1-077401-4.
Huang et al. "A terahertz-driven electron gun" arXiv preprint arXiv:1409.8668, pp. 1-14 (2014).
Huang et al. "High conversion efficiency, high energy terahertz pulses by optical rectification in cryogenically cooled lithium niobate". In "Opt. Lett." 38:(5), 796-798 (2013).
Jones et al., "Calculated spectrum of inverse-Compton-scattered photons" in "Physical Review" vol. 167, No. 5 (1968): 1159-1169.
Keathley et al., "Strong-field photoemission from silicon field emitter arrays" in "Annalen der Physik" vol. 525, No. 1-2 (2013): 144-150.
Krafft et al., "Pulsed laser nonlinear Thomson scattering for general scattering geometries" in "Physical Review" vol. E 72, No. 5 (2005): 056502-1-056502-10.
Krueger et al., "Attosecond control of electrons emitted from a nanoscale metal tip", in "Nature" vol. 475, No. 7354 (2011): 78-81.
Maroli et al., "Compact X-ray Free Electron Lase Based on an Optical Undulator," Proceedings of FEL 2007, Novosibirsk, Russia, pp. 244-247.
Mustonen et al., "Five picocoulomb electron bunch generation by ultrafast laser-induced field emission from metallic nano-tip arrays" in "Applied Physics Letters" vol. 99, No. 10 (2011): 103504-1-103504-3.
Nanni et al., "Linear electron acceleration in THz waveguides" in "Proceedings of IPAC2014", Dresden 2014, WEOAB03, pp. 1896-1899.
Nanni et al.,"Terahertz-driven linear electron acceleration", Nature Communications, pp. 1-8 (2015), DOI: 10.1038/ncomms9486.
Phuoc et al., "All-optical Compton gamma-ray source" in "Nature Photonics" vol. 6, No. 5(2012): 308-311.
Piglosiewicz et al., "Carrier-envelope phase effects on the strong-field photoemission of electrons from metallic nanostructures" in "Nature Photonics" vol. 8, No. 1 (2014): 37-42.
Powers et al., "Quasi-monoenergetic and tunable X-rays from a laser-driven Compton light source" in "Nature Photonics" vol. 8, No. 1 (2014): 28-31.
Serafini et al., "Ultra-short electron bunch generation with a rectilinear compressor" in "Proceedings of the 2001 Particle Accelerator Conference", vol. 3, pp. 2242-2244 (2001).
Swanwick et al., "Nanostructured ultrafast silicon-tip optical field-emitter arrays" in "Nano Letters" vol. 14, No. 9 (2014): 5035-5043.
Tantawi et al., "Experimental Demonstration of a Tunable Microwave Undulator", Physcial Review Letters, vol. 112, pp. 164802-1-164802-5 (2014).
Tran et al., "Free-Electron Lasers with Electromagnetic Standing Wave Wigglers", IEEE Journal of Quantum Electronics, vol. QE-23, No. 9, pp. 1578-1589 (1987).
Travish et al., "An Optical-Scale Period Undulator for Hard X-Ray Production from Compact Devices?", FLS 2012 at Thomas Jefferson National Accelerator Facility, Mar. 5-9, 2012.
Travish et al., "Laser powered dielectric-structures for the production of high-brightness electron and x-ray beams", Proc. of SPIE, vol. 8079, pp. 80790K-1-807905-16 (2011).

(56) References Cited

OTHER PUBLICATIONS

Wong et al., "Compact electron acceleration and bunch compression in THz waveguides", Optics Express, vol. 21, No. 8, pp. 9792-9806 (2013).
Yanagisawa et al., "Energy Distribution Curves of Ultrafast Laser-Induced Field Emission and Their Implications for Electron Dynamics", PRL, vol. 107, pp. 087601-1-087601-5 (2011).
Yoder et al., "Side-coupled slab-symmetric structure for high-gradient acceleration using terahertz power", Physical Review Special Topics—Accelerators and Beams, vol. 8, pp. 11301-1-11301-9 (2005).

* cited by examiner

X-RAY PULSE SOURCE AND METHOD FOR GENERATING X-RAY PULSES

BACKGROUND OF THE INVENTION

The invention relates to an X-ray pulse source for generating X-ray pulses, in particular to an X-ray pulse source including an electromagnetic radiation based undulator. Furthermore, the invention relates to a method of creating X-ray pulses, in particular comprising the steps of photo-induced generating electron pulses, accelerating the electron pulses and creating the X-ray pulses by an interaction of the electron pulses and electromagnetic pulses. Applications of the invention are available in creating X-rays e. g. for imaging and/or investigation purposes, in particular for attosecond imaging and spectroscopy, for seeding an X-ray Free Electron Laser, for phase contrast imaging, X-ray crystallography and spectroscopy, lithography, X-ray scattering techniques, or ultrafast X-ray analysis.

For describing the background of the invention, particular reference is made to the following publications:

[1] G. A. Krafft et al. in "Physical Review" vol. E 72, no. 5 (2005): 056502;
[2] E. Esarey et al. in "Physical Review" vol. E 48, no. 4 (1993): 3003;
[3] F. C. Jones et al. in "Physical Review" vol. 167, no. 5 (1968): 1159;
[4] K. Ta. Phuoc et al. in "Nature photonics" vol. 6, no. 5(2012): 308-311;
[5] N. D. Powers et al. in "Nature Photonics" vol. 8, no. 1 (2014): 28-31;
[6] S. Chen et al. in "Physical Review Letters" 110, no. 15 (2013): 155003;
[7] Gil Travish et al. "An Optical-Scale Period Undulator for Hard X-ray Production from Compact Devices?" FLS 2012, March 5-9 at Thomas Jefferson National Accelerator Facility;
[8] Gil Travish et al. in "SPIE Optics+ Optoelectronics. International Society for Optics and Photonics," 2011.
[9] C. Maroli, V. Petrillo, L. Serafini, A. Bacci, A. Rossi, and P. Tomassini, "Compact X-ray Free Electron Laser Bases on an Optical Undulator," Proceedings of FEL 2007, Novosibirsk, Russia;
[10] L. Serafini et al. in "Particle Accelerator Conference, 2001" Proceedings of the PAC 2001. 2001, vol. 3, pp. 2242-2244. IEEE, 2001;
[11] F. Grüner et al. in "Applied Physics" B 86, no. 3 (2007): 431-435;
[12] T. M. Tran et al. in "Quantum Electronics, IEEE Journal of" 23, no. 9 (1987): 1578-1589.
[13] C. Chang et al. in "Physical Review letters" 110, no. 6 (2013):064802;
[14] J. Gea-Banacloche et al. in "Nuclear Instruments and Methods in Physics Research" Section A: Accelerators, Spectrometers, Detectors and Associated Equipment 272, no. 1 (1988): 199-205;
[15] J. Gea-Banacloche et al. in "Quantum Electronics, IEEE Journal of " 23, no. 9 (1987): 1558-1570;
[16] J. C. Gallardo et al. in "Quantum Electronics, IEEE Journal of" 24, no. 8 (1988):1557-1566;
[17] A. Bacci et al. in "Physical Review—Special Topics—Accelerators and Beams" 9, no. 6 (2006): 060704;
[18] W. S. Graves et al. in "Physical Review Letters" 108, no. 26 (2012): 263904;
[19] W. R. Huang et al. "A terahertz-driven electron gun" arXiv preprint arXiv:1409.8668 (2014).
[20] L. J. Wong et al. in "Optics Express" vol. 21, no. 8 (2013): 9792-9806;
[21] E. A. Nanni et al. in "International Particle Accelerator Conference", Dresden 2014, WEOAB03;
[22] R. B. Yoder et al. in "Physical Review—Special Topics Accelerators and Beams" vol. 8, no. 11 (2005): 111301;
[23] S. Tantawi et al. in "Physical Review Letters" vol. 112, no. 16 (2014): 164802;
[24] P. Hommelhoff et al. in "Physical Review Letters" vol. 96, no. 7 (2006): 077401;
[25] R. Bormann et al. in "Physical Review Letters" vol. 105, no. 14 (2010): 147601;
[26] P. Dombi et al. in "Nano Letters" vol. 13, no. 2 (2013): 674-678;
[27] B. Piglosiewicz et al. in "Nature Photonics" vol. 8, no. (2014): 37-42;
[28] H. Yanagisawa et al. in "Physical Review Letters" vol. 107, no. 8 (2011):087601;
[29] P. D. Keathley et al. in "Annalen der Physik" vol. 525, no. 1-2 (2013): 144-150;
[30] M. Kruger et al. in "Nature" vol. 475, no. 7354 (2011): 78-81;
[31] A. Mustonen et al. in "Applied Physics Letters" vol. 99, no. 10 (2011): 103504;
[32] M. E. Swanwick et al. in "Nano Letters" vol. 14, no. 9 (2014): 5035-5043;
[33] R. G. Hobbs et al. in "ACS nano" 8 (11), pp 11474-11482 (2014);
[34] S.-H. Huang et al. in "Opt. Lett." 38:(5), 796-798 (2013);
[35] U.S. Pat. No. 7,382,861;
[36] US 2014/0314114;
[37] US 2012/0288065; and
[38] U.S. Pat. No. 5,150,192.

X-rays are the most powerful tool to understand structure and function of materials from the micro scale down to the atomic level. The structure of every virtual material in our daily lives has been determined by X-rays and some of the most powerful medical imaging tools are based on X-ray technology. X-ray sources with multi keV photon energy are needed to perform a variety of applications ranging e. g. from medical imaging, like phase contrast imaging in the X-ray domain to X-ray crystallography. Practical requirements to the X-ray sources comprise in particular compactness, coherence and brilliance.

Compact coherent X-ray sources are based on high-order harmonic generation (HHG), which is so far the only technique to generate completely, i.e. spatially and temporally, coherent X-rays. Electrons are ionized from an atom in a gas via a strong field of a femtosecond laser. Some of these electrons ionized with the correct phase with respect to the driving laser field are accelerated within approximately a half-cycle and re-collide with the partly ionized atom which drives a strong polarization wave in the atom-returning electron system that leads to the emission of sub-femtosecond or attosecond pulses of EUV to soft-X-ray photons.

Limitations of the HHG technique result from the relatively low photon energies (hard X-ray range is not available) and low brilliance for high photon energies. In addition, achieving a coherent X-ray radiation from an HHG process is challenging and still under debate.

Alternatively, available X-ray sources with the desired beam properties and brilliance are based on relativistic electron beams from linear accelerators, i.e., large scale Free Electron Lasers (FEL). Facilities like LCLS in the US and the future European XFEL project are linear accelerator (LINAC) based and accelerate electrons to highly relativistic (10 GeV) energies. This high energy is necessary for an undulator with a typical period of 3 cm and total length of 100 m to produce coherent radiation via the self-amplified stimulated emission process (SASE) in the FEL. A LINAC relies on room temperature or super-conducting RF technology. The accelerating gradients in either case are limited to several tens of MeV per meter limited by field emission from cavity walls. The LINAC length, therefore, must be in the km regime and facility costs are in the billion Euro category.

The concept of colliding a relativistic electron bunch with an electromagnetic wave to produce X-ray radiation can be considered in two main regimes, namely incoherent radiation and coherent radiation. In the incoherent regime (so-called inverse Compton scattering or Thomson scattering, [1]-[6]), the electrons in a bunch move within a counter-propagating electromagnetic wave and consequently radiate an electromagnetic wave. The produced radiation is completely incoherent due to the random distribution of the electrons.

The coherent regime uses sources in which the radiation of electrons affects the electron bunch and makes the electrons ordered at the radiation wavelength scale. This leads then to coherent radiation or the so-called FEL regime. In this case, one usually considers the counter-propagating electromagnetic wave as an optical or in general electromagnetic undulator.

The use of electromagnetic undulators for the production of coherent X-ray beams has been widely presented over the last decades. Conventionally, the relativistic electrons which collide with an optical beam are produced according to one of the following approaches. In [7] and [8], the electrons are accelerated using a high power laser beam coupled into a dielectric nanostructured device. However, due to the small wavelengths of the optical lasers, the accelerated bunches using the considered laser acceleration scenario, are too small to radiate sufficiently in the X-ray regime. In [9], radiofrequency (RF) linear accelerators are considered to inject electrons into an optical undulator. There are also several proposals for a compact X-ray source based on electron bunches from laser plasma acceleration [11].

Furthermore, using a general electromagnetic wave undulator without focusing on the type of electron accelerators has been described in [14], [15], [17] and [35]. In [36], THz beams have been used as an undulator. Similarly, using a microwave undulator combined with RF accelerated electron beams is experimentally reported in [23]. Various studies focus on the efficiency of the source and properties of the X-ray radiation when different electromagnetic undulator types, namely a standing wave [12] or a Gaussian beam [16], are used.

The common point between all these prior art ideas is the use of optical or THz undulatory, which is mainly motivated by the aimed compactness of the overall device. Various schemes for electron acceleration are pursued in the previous proposals, namely radio frequency (RF) acceleration, optical acceleration in dielectric waveguides and laser-plasma wake field acceleration. However, RF accelerators require high RF-power sources and large facilities due to the long wavelength and need to fill large cavity volumes and low accelerating gradients, making the ultimate device not compact. Optical acceleration in dielectric waveguides is a solution recently studied to achieve short accelerated electron bunches. The main drawback of this scheme is the strong limits it puts on the bunch charge, or simply the number of electrons in a single bunch that can be accelerated. Since the coherent X-ray emission is proportional to the square of the number of electrons in a bunch, not much emission can be expected from this approach. Additionally, the accelerated electron bunch suffers from a large energy spread. Both disadvantages emanate from the short wavelength of the electromagnetic wave. The third strategy, which is the laser-plasma wakefield acceleration, has the potential for a compact device, low emittance beams and also high charge electron bunches. In fact, due to these outstanding capabilities, this method has received extensive attention in the last years. Nonetheless, the scheme suffers from large energy spreads in the produced relativistic electrons due to plasma instabilities and the robustness of bunch parameters from shot to shot.

Another approach to achieve a coherent X-ray beam without benefiting from the undulator radiation is introduced in [18] and [37], where a periodic arrangement of electrons emitted from nano-emitter arrays is sent to an emittance exchange line. Subsequently, the longitudinally ordered electrons will radiate coherently when scattered off an electromagnetic wave.

Few publications have focused on THz acceleration for producing relativistic electrons. In [19], the acceleration of electrons using a THz beam is presented. In [20] and [22], THz acceleration in waveguides is theoretically studied and recently performed experimentally [21]. However, the concept of using THz accelerated and compressed electrons was restricted to theoretical considerations.

The use of optically driven field emitter arrays to produce electron beams for injection into an accelerator has been studied widely in the last years. These devices make use of enhanced optical fields at sharp metal tips. The high fields allow for operation in the strong-field emission regime, where ultrafast response times are possible and consequently short bunches can be produced ([24]-[30]). Ultrafast field emitter arrays [38] have been studied previously both theoretically and experimentally ([31]-[33]).

In brief summary, FEL sources are the only devices capable of producing high brightness, spatially and temporally coherent hard X-ray radiation. However, the current large scale facilities require high energy and charge electron beams, which does not allow for a compact format and the utilized RF-technology makes them inappropriate for sub-fs pulse generation. The high cost of FEL based X-ray sources does not lead to a widespread use in X-ray research and limits the speed of progress in this area. Therefore, there is a strong interest in a compact (laboratory scale) source, even if incoherent but providing critical flux levels with much higher spatial coherence compared to today's laboratory sources. Such a source could lead to a widespread dissemination, like conventional optical lasers, into research labs, materials characterization laboratories and hospitals.

OBJECTS OF THE INVENTION

The objectives of the invention are to provide an improved X-ray pulse source and an advanced method of creating X-ray pulses, which avoids the disadvantages of conventional techniques. In particular, the objective of the invention is to provide the X-ray pulse source with a compact structure, low costs, scalability in terms of photon energy and/or an extended range of applications. Furthermore, the X-ray pulse source and X-ray pulse method in particular are to be capable of creating the X-ray pulses with a broad range of photon energies, a short pulse duration, in particular sub-fs duration, and/or a high brilliance, with a variability in terms of creating the X-rays as pulsed incoherent radiation or as pulsed spatially and temporally coherent radiation.

These objectives are solved with an X-ray pulse source and a method of creating X-ray pulses of the invention.

SUMMARY OF THE INVENTION

According to a first general aspect of the invention, the above objective is solved by an X-ray pulse source for generating X-ray pulses, including an electron pulse source device and an electromagnetic interaction device being commonly arranged for generating the X-ray pulses by an interaction of electron pulses and electromagnetic pulses. The electron pulse source device comprises a photo-emitter device for creating the electron pulses (electron bunches) and a driver device for accelerating the electron pulses along an acceleration path. The acceleration path runs from the photo-emitter device to the electromagnetic interaction device. Preferably, the acceleration path extends in a straight evacuated waveguide channel. The electromagnetic interaction device comprises an electromagnetic pulse source device and an interaction section, wherein the electromagnetic pulse source device is configured for providing electromagnetic pulses in the interaction section. The electron pulse source device and the electromagnetic pulse source device are operable with a control device such that electron pulses accelerated along the acceleration path and the electromagnetic pulses hit each other in the interaction section. Depending on the operation setting of the X-ray pulse source, the interaction (inverse Compton scattering) of the electron pulses and the electromagnetic pulses results in incoherent or coherent X-ray radiation. In the latter case, the electromagnetic interaction device acts as an electromagnetic undulator. Thus, the term "electromagnetic undulator" used herein refers to the electromagnetic interaction device or sometimes in a narrower sense to the electromagnetic pulses provided by the electromagnetic interaction device.

The photo-emitter device of the electron pulse source device generally includes an emitter portion which is configured for photo-induced creating the electron pulses of free electrons. Preferably, the emitter portion is made of a metal, like Au, Cu, Ag, W, or a semiconductor, like CsTe, GaAs, Si, and it is exposed for an irradiation with excitation pulses and for emitting the electron pulses. The photo-emitter device further includes a laser source for creating the excitation pulses. The wavelength of the excitation pulses is selected in dependency on the material of the emitter portion in a UV, VIS, MIR or IR range. As an example, with a metal emitter portion, an UV laser source is preferred, while a blue or green emitting laser source can be provided for irradiating a semiconductor emitter portion.

The driver device of the electron pulse source device generally is configured for creating driver pulses accelerating the electron pulses along the acceleration path of the electron pulse source device. According to the invention, the driver device includes a THz driver pulse source, which is configured for creating single cycle and/or multi-cycle THz driver pulses.

According to a second general aspect of the invention, a method of creating X-ray pulses comprises the steps of photo-induced generating electron pulses and accelerating the electron pulses along an acceleration path by the effect of driver pulses, and creating the X-ray pulses by an interaction of the electron pulses and electromagnetic pulses. According to the invention, the driver pulses comprise single cycle and/or multi-cycle THz driver pulses. Preferably, the inventive method of creating X-ray pulses is conducted using the X-ray pulse source according to the first general aspect of the invention.

A key feature of the invention is provided by accelerating the photo-induced electron pulses with the single cycle or multi-cycle THz driver pulses. The term "THz driver pulses" used herein refers to pulses of electromagnetic radiation having an electromagnetic carrier wave with a frequency of THz radiation, preferably at least 0.1 THz, particularly preferred at least 0.3 THz and/or at most 3 THz, particularly preferred at most 1 THz or 0.6 THz. Furthermore, the THz driver pulses used according to the invention are single cycle pulses, i.e., the single cycle THz driver pulses have a duration below two periods of the electromagnetic carrier wave, particularly preferred a duration corresponding to one period of the electromagnetic carrier wave or less.

Alternatively, the THz driver pulses used according to the invention are multiple cycle pulses having a duration above one period of the electromagnetic carrier wave.

The THz frequencies provide many advantages compared to the optical and RF frequencies. On one side the wavelength is long enough that waveguide fabrication, accurate timing and acceleration of a significant amount of charge per electron pulse is feasible. On the other side, the frequency is high enough and the driver pulses can be very short, e. g. below 1 ns, so that the RF breakdown threshold is increased into the GV/m range. Preferably, using optical generation techniques very short THz pulses can be produced with a pulse length in a range of 1 ps to 100 ps, which limits pulsed heating and the average power load, enabling operation at high repetition rates on the order of kHz and eventually higher. Furthermore, the 100 times larger gradient of THz pulses when compared to RF waves offers stronger compression of electron pulses much further than possible at RF-frequencies.

Advantageously, the inventors have found that THz acceleration is well suited to achieve electron beam parameters (emittance and peak current) suitable for coherent lasing in optical undulators due to its unique ability to produce high gradients and low energy spread. Thus, low emittance electron beams can be produced with large bunch charge and small energy spread in the framework of a compact table-top electron beam and x-ray source. With more details, the acceleration with the single or multi cycle THz driver pulses provides an operation at typically 200 times higher driver frequencies compared with the conventional RF accelerators, which in particular increases the threshold for field emission and offers the operation at 10 to 20 times higher field strengths in the range of 100 MV/m to 5 GV/m. The higher operating frequency and field strength additionally enable bunch compression of the electron pulses to few femtosecond or even sub-femtosecond duration. Thus, as a main advantage of the invention, the application of the THz driver pulses offers a reduction of the length of the acceleration path compared with conventional RF accelerators, resulting from the increase of the electrical breakdown threshold in waveguides providing the acceleration path into the GV/m range. This allows a combination of a compact electron pulse source device with a compact electromagnetic pulse source device resulting in a compact overall structure for a high brightness short pulse X-ray source.

Accordingly, the inventive X-ray pulse source comprises a THz-driven electron source combined with an electromagnetic interaction device, in particular an electromagnetic undulator. The inventive X-ray pulse source does not include a static magnetic undulator. On the contrary, the electromagnetic undulator is provided with periods from the THz to optical range, and eventually adapted for coherent inverse Compton scattering, with a period on the order of 100 μm to 1 μm, which leads up to 10,000 times shorter undulator lengths compared to the length of magnetic undulators in conventional FEL based X-ray sources. This in turn allows reduction of electron beam energy from 10 GeV to 50 MeV to reach sub-Angstrom radiation. Therefore, the invention is capable of providing a compact X-ray source with a characteristic extension, e. g. length in a range of 1 m to 10 m, with correspondingly thousand times less facility costs overall. In other words, the X-ray source size can be much smaller than a typical FEL size by as much as a factor of 1000 to 10000. Similarly, the power and operating cost to operate such a device is 1000 to 10000 times less. Due to the lower cost it will open up many applications currently only possible at large-scale facilities.

The advantage of this invention in comparison to the conventional HHG technique is that the inventive technique scales well into the hard X-ray range, which is technically much more important than EUV, because it enables spatial resolution in the atomic scale. Contrary to the HHG technique, the invention enables spatio-temporal investigation with atomic spatial resolution and femtosecond, e. g. less than 10 fs, to attosecond temporal resolution.

According to a preferred embodiment of the invention, the photo-emitter device comprises a field emitter array.

Preferably, the electron pulses are generated by optical field emission. The term "field emitter array" refers to a planar arrangement of emitter tips providing the emitter portion of the photo-emitter device. Preferably, the field emitter array comprises a nanostructured photocathode. All emitter tips of the field emitter array are simultaneously exposed to the excitation pulses, so that a plurality of electrons are emitted from the field emitter array. Advantageously, with the controlled field emission of electrons from emitter tips and a compact driver device using THz acceleration a fully coherent X-ray source producing even attosecond pulses can be provided operating similar to a free-electron laser.

With the preferred use of coherent excitation pulses, a field emission threshold is obtained at all tips simultaneously, so that electron emission at the tips is synchronized. Advantageously, this allows producing temporally and eventually even spatially correlated electron pulses resulting in a modulated electron beam that, preferably after further acceleration and compression, is modulated at the X-ray wavelength to be produced. The strength of the modulation determines the necessary length of the electromagnetic undulator to reach lasing and enables temporally fully coherent X-rays. If the beam is fully modulated the electromagnetic undulator can be short. This determines the necessary energy of the electromagnetic pulses provided by the electron pulse source device constituting the electromagnetic undulator.

The invention is not restricted to the use of a field emitter array. According to an alternative embodiment of the invention, the photo-emitter device may comprise a planar photocathode, made of e. g. metals or semiconductors as explained above.

According to a further preferred embodiment of the invention, the THz driver pulse source is coupled via a THz driver waveguide with the acceleration path. The THz driver waveguide is coupled with the waveguide channel extending from the photo-emitter device to the electromagnetic interaction device. The term "THz driver waveguide" indicates any waveguide being designed for transmitting THz radiation to the waveguide channel, in particular to the location of photo-induced creating of the electron pulses.

Advantageously, the THz driver pulse source can comprise a single source stage which is adapted for creating the THz driver pulses by optical rectification. The THz driver pulse source includes an optical source and a rectification setup for optical rectification, e. g. as described in [34]. Using the single cycle source stage has advantages for a compact structure of the X-ray pulse source. Alternatively, the THz driver pulse source can comprise multiple, e. g. two three or even more source stages each being configured for creating single cycle or multi cycle THz driver pulses, e. g. by optical rectification. The multiple source stages can be successively coupled with the waveguide channel via separate THz driver waveguides. Using the multiple source stages has advantages in terms of providing additional degrees of freedom for optimizing the accelerating effect of the THz driver pulse source.

According to a further preferred embodiment of the invention, the X-ray pulse source further comprises an accelerator device being arranged downstream of the electron pulse source device, in particular between the THz driver pulse source and the electromagnetic interaction device. The accelerator device comprises at least one additional THz pulse source (indicated as THz accelerator pulse source). Advantageously, the electron pulses are further accelerated along the acceleration path. The THz accelerator pulse source can comprise a single source stage or preferably multiple source stages, each coupled via THz driver waveguide(s) with the waveguide channel. The THz accelerator pulse source can be operated for creating single-cycle or multi-cycle THz pulses.

According to a further preferred embodiment of the invention, the X-ray pulse source further comprises a compressor device and/or a focusing device. These components have advantages for shaping the accelerated electron pulses in time and space, in particular for a coherent creation of X-ray pulses.

The compressor device is coupled between the electron pulse source device and the electromagnetic interaction device for temporarily compressing the electron pulses. Preferably, the compressor device is arranged downstream of the accelerator device. The compressor device comprises at least one additional THz pulse source (indicated as THz compressor pulse source). Alternatively, the accelerator device and the compressor device are provided by one common THz pulse source. By the effect of single-cycle or multi-cycle THz pulses, the electron pulses can be compressed by a factor of at least 10, e. g. 60 or even more. Thus, the electron pulses are additionally compressed to much shorter bunch lengths compared to conventional RF acceleration techniques. In particular, this compression step makes the coherent radiation from an optical undulator achievable, leading to an overall compact X-ray source.

The focusing device resides between the electron pulse source device and the electromagnetic interaction device for focusing the electron pulses to the interaction section of the optical interaction device. Preferably, the focusing device is arranged downstream of the compressor device. Focusing is obtained by the effect of magnetic fields, preferably created with quadrupole magnets of the focusing device.

According to a particularly preferred embodiment of the invention, the electron pulse source device and the electromagnetic pulse source device are configured such that the interaction of the electron pulses and the electromagnetic pulses is a coherent interaction. The inventors have found that predetermined operation conditions support the coherent interaction, which preferably are obtained with the provision of the compressor and focusing devices. Firstly, the compressor and focusing devices are controlled with a control device such that electron pulses are accelerated to the interaction section, which are compressed to an axial dimension below 3 µm, preferably below 0.3 µm, having peak currents above 1 kA, preferably above 10 kA. Furthermore, the electromagnetic pulse source device of the electromagnetic interaction device is controlled with the control device, such that electromagnetic pulses are provided in the interaction section, having a pulse length (duration) being matched for maximum gain of the coherent radiation. In particular, the pulse length is at least 100 fs, preferably at least 500 fs, and the intensity of the electromagnetic pulses is chosen such that the normalized vector potential $a_0$ is between 0.1 and 1, which corresponds at a wavelength of 1 micron to an intensity of $$1.3*(a_0)^2*10^{18} \text{ W/cm}^2.$$

For the coherent operation, the electromagnetic pulse source device preferably includes a resonator including the interaction section. Advantageously, the resonator allows a recycling of the electromagnetic pulses for several collisions. Preferably, the direction of the electromagnetic pulses is opposite to the traveling direction of the electron pulses. Counter propagating electromagnetic pulses and electron pulses are preferred for the coherent operation. However, as an alternative, an oblique incidence may also lead to a coherent interaction, depending on the electromagnetic pulse strength. The denser the electron pulse is, i.e. higher peak current, the faster the undulator operation regime (free-electron laser) is achieved. Therefore, at low pulse charge, a high compression of the electron pulse is preferred.

Fully coherent radiation from the electromagnetic undulator, i.e. the FEL-lasing regime, is preferably obtained with the provision of the above modulation in the electron density of the electron pulses. The period of the modulation imprinted on the pulses is adapted to the wavelength of the X-ray wavelength to be generated.

According to an alternative embodiment of the invention, the electron pulse source device and the electromagnetic pulse source device can be arranged such that the interaction of the electron pulses and the electromagnetic pulses is an incoherent interaction comprising inverse Compton scattering. Advantageously, for the incoherent interaction, there is no constraint for structure of the electromagnetic interaction device.

BRIEF DESCRIPTION OF THE DRAWINGS

Further details and advantages of the invention are described in the following with reference to the attached drawings, which show in.

DETAILED DESCRIPTION OF PREFERRED EMBODIMENTS

Figure 1:
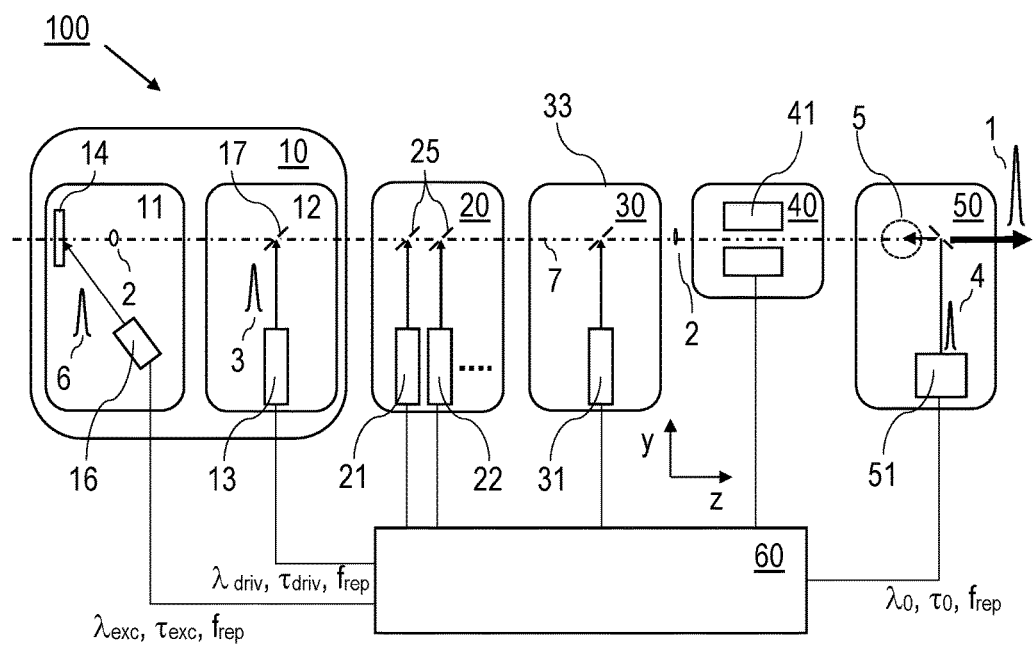
FIG. 1: a schematic illustration of an X-ray pulse source according to a preferred embodiment of the invention.
Figure 2:
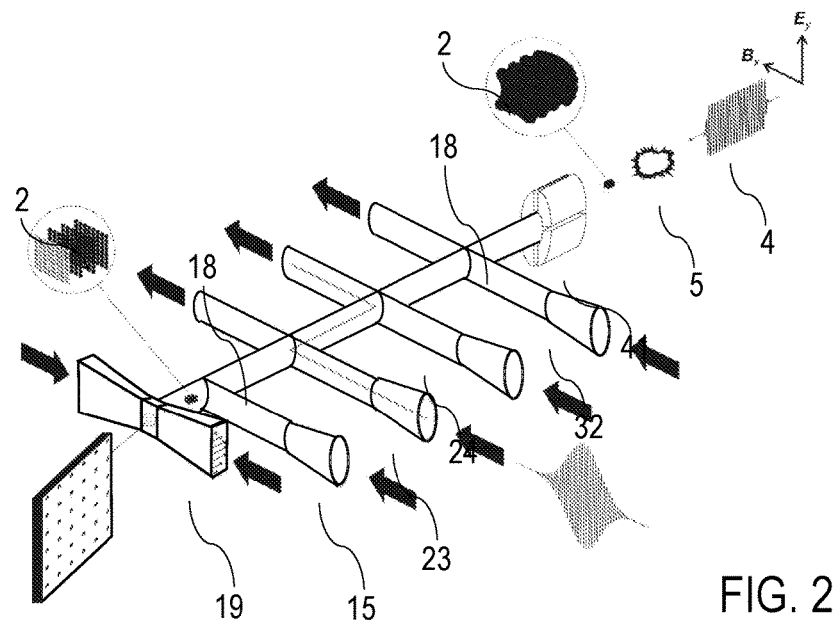
FIG. 2: further details of the X-ray pulse source according to FIG. 1.

Features of preferred embodiments of the inventive X-ray source and the inventive method for creating X-ray pulses are described in the following with reference to FIGS. 1 and 2 showing the combination of an electron pulse source device including the THz driver pulse source for creating single cycle and multi-cycle THz driver pulses with the electromagnetic undulator. It is emphasized that details of the pulse sources for creating excitation pulses for the photoemission of the electrons, THz pulses for driving, accelerating and compressing purposes, and electromagnetic undulator pulses, as well as details of the inverse Compton scattering or FEL processes are not described as they are known as such from prior art. Furthermore, it is emphasized that the figures present schematic illustrations only. Details of the X-ray source, like sensor and monitoring equipment, vacuum equipment or enclosing vessels are not shown. The components of the X-ray source are illustrated as being controlled with a control device which may comprise a single control circuit or a plurality of control circuits separately coupled with the components of the X-ray source.

The X-ray source is illustrated with reference to a preferred embodiment for coherent X-ray generation. To this end, driver, accelerator, compressor and focusing devices are provided as outlined below. It is emphasized that the accelerator, compressor and focusing devices represent optional features of the invention. In particular, the accelerator device could be omitted with both of the coherent or incoherent X-ray generation if the driver device provides sufficient acceleration, and the compressor and focusing devices can eventually be omitted especially with the incoherent X-ray generation.

According to the embodiment of FIG. 1, the X-ray source 100 comprises an electron pulse source device 10, an accelerator device 20, a compressor device 30, a focusing device 40, an electro-magnetic interaction device 50 and a control device 60 coupled with each of the components 10 to 50. A straight acceleration path 7 extends in an evacuated waveguide channel (see FIG. 2) from the electron pulse source device 10, in particular from the photo-emitter device 11 thereof, to the electromagnetic interaction device 50 along a z-direction (axial direction). The plane perpendicular to the acceleration path 7 extends in an x-y-plane (radial directions).

The electron pulse source device 10 comprises the photo-emitter device 11 and the driver device 12. The photo-emitter device 11 includes a laser source 16 and a field emitter array 14. The laser source 16 is a pulse laser, like e.g. an amplified femtosecond laser, which preferably is provided with a control of carrier-envelope phase (CEP). The field emitter array 14 (enlarged schematic illustration in FIG. 2) is a nanostructured photocathode having a characteristic extension in radial direction of about 5 µm to 100 µm. As an example, the field emitter array 14 comprises a planar arrangement of Si-tips with a mutual distance of e.g. 0.5 µm to 1 µm and a height in axial direction in the range of 2 µm to 50 µm. As an example, $10^6$ emitter tips provide an emitter portion of the field emitter array 14. With alternative examples, the single emitters of the field emitter array 14 comprise metallic islands with sharp tips on an atomic scale, having a height of 200 nm and a mutual distance of 400 nm, arranged on an emitter portion with an extension of 30 µm 30 µm. According to yet another example, the single field emitters can be provided by quantum well structures created in a substrate of a semiconductor material. The use of quantum well structures may have particular advantages in terms of creating low energy spread electrons ("cold" electrons).

Excitation pulses 6 are created with the laser source 16 with a repetition rate $f_{rep}$, a pulse duration $\tau_{exc}$ and a wavelength $\lambda_{exc}$ selected with the control device 60, in particular in dependency on the material and geometry of the field emitter array 14. As examples, $f_{rep}$ is above 100 Hz, e.g. in the range from 1 kHz to 1 MHz, while $\tau_{exc}$ is in a range from 5 fs to 200 fs, e. g. 10 fs, $\lambda_{exc}$ in a range from 200 nm to 10.000 nm, e. g. 800 nm, and an excitation pulse energy is in a range of 100 nJ to 10 µJ. The excitation pulses 6 may comprise rectangular shaped multi-cycle laser pulses that are polarized along the in-plane field emitter elements (y-axis). The incoming field strength of the excitation pulses 6 is tuned such that plasmonic and tip field enhancement lead to a resulting field at the tips, which is typically 10 to 100 times stronger than the incoming field alone and sufficient for field emission of preferably one electron per emitter and cycle.

The field emitter array 14 is arranged at an input side of the waveguide channel 18. Photo-emitted electrons released by the field emitter array 14 are directly subjected to driving single- or multi cycle THz driver pulses 3 created by the driver device 12. Alternatively, the photo-emitted electrons are pre-accelerated as follows (see FIG. 2). The electrons freed at the field maximum in each cycle of the excitation pulses 6 can be accelerated by radially polarized THz pulses, which is created with a separate THz pulse source (not shown) or split from THz driver pulses 3 created by the driver device 12. The THz pulses are directed to the field emitter array 14 via a THz waveguide 19 (see FIG. 2), or they may propagate through the substrate of the field emitter array 14. This process results in the formation of the electron pulse 2, which is emitted from the field emitter array 14 and further accelerated by the strong THz driver pulses 3. Advantageously, the impact of the THz field on the emission is weak and very slow over the single or multi-cycle IR-field of the excitation light 6 by the physical arrangement of the field emitter array 14 as the longitudinal driving THz field is orthogonal to the field emitter array elements, or feature sizes are used, which are smaller than the THz skin depth, so that a plasmonic enhancement of the THz field is prevented.

The driver device 12 comprises a THz driver pulse source 13 coupled via a waveguide 15 (see FIG. 2) with the evacuated waveguide channel 18. The THz pulse source 13 may be designed as described e.g. in reference [34]. The THz driver pulse source 13 creates single-cycle THz driver pulses 3 with a duration $\tau_{driv}$, a repetition rate $f_{rep}$, a frequency of the carrier wave $f_{driv}$, a phase $\varphi_{driv}$ and an amplitude $A_{driv}$ adjusted with the control device 60. The pulse duration $\tau_{driv}$ is selected in a range of e.g. 1 ps to 100 ps. The repetition rate $f_{rep}$ of the THz driver pulses 13 is matched to the repetition rate of the excitation pulses 6. The THz driver pulses 3 are reflected via a mirror 17 onto the acceleration path 7. The mirror 17 includes a central hole through which electron pulses 2 can travel along the acceleration path. The polarization of the THz driver pulses 3 is selected such that the axial component of the electron pulses 2 is accelerated.

With a practical example, the emitted electron pulses 2 have the following features. The radial size of the electron pulses 2 is in a range of 20 µm to 100 µm, and the axial length is in a range of 0.03 µm to 10 µm, e. g. 3 µm. The irradiation spot size of the excitation pulses 6 on the field emitter array 14 is in a range of 20 µm to 100 µm. Each electron pulse 2 emitted at the field emitter array 14 has a duration of 0.01-10 fs and carries a charge of about 1 pC to 10 pC. By the application of the THz driver pulses 3, the electron pulses 2 are accelerated to relativistic energy of about 1 MeV to 2 MeV.

The electron pulses 2 have a modulation structure as shown in the enlarged illustration in FIG. 2. The modulation structure is obtained by the excitation pulses 6 and the simultaneous excitation of all emitter tips of the field emitter array 14.

The illustrated driver device 12 includes a THz driver pulse source 13 with one single source stage only. In a practical embodiment, the single THz driver pulse source 13 can have multiple THz driver stages, each being operated with an appropriately selected frequency $f_{driv}$ and/or phase $\varphi_{driv}$, so that a net acceleration of the electron pulse 2 is obtained at the output of the electron pulse source 10.

The accelerator device 20 is coupled with the waveguide channel 18 (see FIG. 2). The accelerator device 20 includes a THz accelerator pulse source with a consecutive arrangement of multiple accelerator source stages 21, 22, which are arranged for additionally accelerating the electron pulses 2 along the acceleration path 7. THz acceleration pulses are coupled via THz waveguides 23, 24 (see FIG. 2) and the mirrors 25 to the acceleration path 7 in the waveguide channel 18. The mirrors 25 have a double function in terms of superimposing a current THz pulse with an electron pulse and reflecting a previous THz pulse from a forgoing acceleration stage out of the waveguide channel 18 (see FIG. 2).

The frequency of the carrier wave, phase and amplitude of the THz accelerator pulses are adjusted by the control device 60 for a constructive acceleration of the electron pulses 2. As a result, the electron pulses 2 have relativistic speeds of about 10 MeV to 30 MeV at the downstream side of the accelerator device 20. This acceleration can be obtained by single-cycle or multi-cycle THz accelerator pulses, which typically have an energy of 5 mJ to 20 mJ.

The electron pulses 2 are accelerated in the waveguide channel 18 by the single cycle THz driver pulses 3 and the single-cycle or multi-cycle THz accelerator pulses. To achieve efficient acceleration, the waveguide channel 18 preferably provides phase matching between the phase velocity of the THz wave and the electron pulse 2 propagating at a speed less than c is necessary. This matching task is solved by using a dielectrically loaded metal waveguide excited with a TM01 mode. As an example, 20 mJ, 10-cycle pulses at 0.6 THz frequency can accelerate a 1 MeV initial electron bunch up to 10 MeV within only 4 cm propagation including the losses in copper and the group velocity dispersion of the waveguide.

Subsequently, the electron pulses 2 are transferred via the waveguide channel 18 to the compressor device 30. The compressor device 30 includes a THz compressor source 31, which is arranged for temporarily compressing the electron pulses 2 traveling along the acceleration path 7. The THz compressor source 31 creates THz compression pulses, which are coupled via the THz waveguide 32 (see FIG. 2) and the mirrors 33 to the acceleration path 7 in the waveguide channel 18. By the effect of THz compression pulses, an initial pulse length in a range of 10 fs to 100 fs is compressed to a final pulse length in a range of 100 as to 1 fs. With a practical example, for a 1 pC bunch, a bunch length of 500 as is equivalent to a 2 kA electrical current.

The compressor device 30 compresses the relativistic electron pulses 2 to small bunch lengths. For this purpose, the concept of rectilinear compression [10] is applied. The same structure as the accelerators will be used to achieve a THz traveling wave with phase velocity equal to the speed of light. However, the electron pulses 2 will reside in the zero crossing of the THz field, leading to zero total acceleration and effective compression of the bunch. As an example, the electron bunch compression using a 100 cycle 20 mJ THz beam traveling through the waveguide channel 18 provides a 60 fold compression of the electron pulses, meaning that the initial electron bunch length of about 30 µm is compressed to 0.5 µm at the waveguide output. This large amount of compression is feasible only with large field gradients available from THz beams.

The THz accelerator source stages 21, 22 and the THz compressor source 31 comprise sources creating THz pulses by optical rectification as described e.g. in reference [34]. As illustrated in FIG. 1, the THz driver pulses 3, the THz accelerator pulses and the THz compressor pulses are created by separate THz sources. Alternatively, the THz accelerator and compressor sources 21, 22, 31 can be provided by a single common THz source coupled via waveguides and phase shifting components to the waveguide channel 18. Advantageously, both acceleration and compression tasks can be fulfilled by a single THz pulse source.

At the downstream side of the compressor device 30, the focusing device 40 is coupled via the waveguide channel 18. The focusing device 40 comprises an arrangement of quadrupole magnets 41 (see FIG. 2), which are controlled such that the electron pulses 2 are focused into the interaction section 5 of the electromagnetic interaction device 50. With a practical example, an initial radial size in a range of 5 µm to 10 µm is focused to a final radial size in a range of 1 µm to 3 µm. The electron pulses 2 traveling to the interaction section 5 of the electromagnetic interaction device 50 have a charge of e. g. a 3 pC per pulse, a pulse length of with 100 as to fs, and about 15 MeV energy. The energy spread is around 1%.

Finally, the electron pulses 2 enter the electromagnetic interaction device 50 comprising an interaction section 5, where the electron pulses 2 collide for example with high power electromagnetic pulses 4, e. g. laser pulses to produce coherent X-ray pulses 1 via the FEL process. The electromagnetic pulses 4 are created with an electromagnetic pulse source device 51, comprising e. g. a laser source with 1 J and 1 ps long pulses, which is controlled by the control device, in particular for setting the undulator wavelength $\lambda_0$ in a range of 1 µm to 200 µm, the pulse length $\tau_0$ in a range of 500 fs to 20 ps, a laser spot size in a range of 5 µm to 20 µm and a laser pulse energy in a range of 0.1 J to 2 J. The repetition frequency $f_{rep}$ is adapted to the repetition frequency of the electron pulses 2. The electromagnetic pulses 4 comprise e. g. 500 cycle 1 J pulses at $\lambda_0$=1 µm wavelength focused to a $w_0$=20 µm spot size in the interaction section 5.

Based on a one-dimensional FEL model, the creation of the X-ray pulses 1 can be described as follows. The equivalent laser strength parameter or normalized vector potential $a_0$ for the above laser electromagnetic pulses 4 is:

$$\frac{E_0^2}{2Z_0}\pi w_0^2 \times 500 \frac{\lambda_0}{c\sqrt{4\ln 2}} =$$

$$1 \text{ J} \Rightarrow E_0 = \sqrt{\frac{1[\text{J}] \times 240\pi \times c\sqrt{4\ln 2}}{500\pi w_0^2 \lambda_0}} = 1.54 \times 10^{12} \text{ V/m}$$

$$\Rightarrow a_0 = \frac{eE_0}{m\omega c} = 0.48$$

($E_0$: electric field strength, $Z_0$: free space impedance, e. g. 377 Ohm, $\omega$: the laser angular frequency, c: the speed of light, e: the electron charge, and m: the electron rest mass) The radiated X-ray wavelength $\lambda_X$ will then be $$\lambda_X = \frac{\lambda_0}{4\gamma^2}(1 + a_0^2) = 0.34 \text{ nm}$$

It can be shown that in an inverse Compton scattering process the trajectory of the electrons are the same as the trajectory in a FEL process with $\lambda_u = \lambda_0/2$, with $\lambda_u$ being the undulator wavelength. The gain length for the resulting free electron laser is obtained as follows $$\text{Density of electrons} = n_e = \frac{3 \times 10^{-12}}{e \times (5 \times 10^{-6})^2 \times 3 \times 10^{-8}} = 2.5 \times 10^{25} \frac{1}{\text{m}^3}$$

$$\frac{L_{g0}}{\lambda_l/2} = \frac{1}{\sqrt{3}}\left(\frac{\gamma^3 m_e}{\mu_0 a_0^2 e^2 \pi (\lambda_l/2)^2 n_e}\right)^{\frac{1}{3}} \simeq 32.$$

The 500 cycle optical undulator will then be equivalent to about 16 gain lengths which is sufficient for achieving saturated FEL operation. At saturation, the amount of X-ray energy produced is determined by the $\rho$ parameter of the FEL, which reads as $$\varrho_{FEL} = \frac{1}{4\pi\sqrt{3}}\frac{1}{32} = 0.0015 = 0.15\%.$$

$$E_{sat} = \varrho_{FEL} E_{beam} = 1.5 \times 10^{-3} \times 3 \times 10^{-12} \times 15 \times 10^6 = 6.75 \times 10^{-8} \text{ J}$$

The number of photons in each pulse is then obtained as follows:

$$E_{ph} = h\nu = \frac{hc}{\lambda_X} = 5.8 \times 10^{-16} = 3.65 \text{ keV}$$

Total number of photons: $1.16 \times 10^8$

Advantageously, the electron beam energy and the wavelength of the electromagnetic interaction device 50 can be independently increased or decreased to achieve different X-ray beam parameters selected in dependency on the particular application of the X-ray source 100.

In the above calculations, the one-dimensional FEL model can be applied due to the large beam width compared to the laser pulses 4 wavelength. The criterion for validity of the 1D FEL theory is $r_b \gg \sqrt{L_{g0}\lambda_X}$, which yields 5 µm $\gg$ 1.36 nm. At a repetition rate of 1 kHz, the inventive X-ray source 100 would provide an average flux of $10^{11}$ photons per second, which is an order of magnitude above that necessary for phase contrast imaging, for example.

In the following table, a comparison between the estimated flux from the inventive THz-driven X-ray source 100 with an optical undulator and LCLS (Linac Coherent Light Source) at SLAC in the USA is presented.

| Parameter | THz-driven | Source | LCLS |
|---|---|---|---|
| X-ray photon energy | 4 keV | 12.4 keV | 9.6 keV |
| Pulse charge [pC] | 3 | 3 | 150 |
| Electron beam energy [MeV] | 15 | 25 | 10,000 |
| Photon wavelength [nm] | 0.3 | 0.1 | 0.13 |
| Relativistic factor $\gamma$ | 30 | 50 | 20,000 |
| Photon number | $1.6 \, 10^8$ | $1.6 \, 10^8$ | $2 \times 10^{12}$ |
| Average photon flux [$10^{12}$ ph/s] | 0.6 | 0.6 | $2 \times 10^2$ |
| Peak flux [$10^{25}$ ph/s] | 1.2 | 1.2 | 2 |
| Average power [mW] | 0.2 | 0.6 | 500 |
| Bandwidth (FWHM) [%] | 1 | 1 | 0.2-0.5 |
| Average brightness [$10^{20}$ ph/ (s × 2% BW × mm² × mrad²)] | 1.4 | 10 | 160 |
| Peak brightness [$10^{33}$ ph/ (s × 2% BW × mm² × mrad²)] | 6 | 180 | 2 |
| Pulse length [as] | 100 | 7.5 | 100,000 |
| Repetition rate | 1 kHz | 1 kHz | 120 Hz |

The comparison between the two sources shows that the invented compact X-ray source 100 can produce X-ray radiation with similar peak flux compared to large scale FEL facilities. This application is a very advanced application for coherent X-ray sources targeting protein crystallography and high density and warm matter physics.

Further applications would benefit from the quasi-monochromatic laboratory scale hard X-ray source of the invention, having orders of magnitude larger average flux and higher spatial coherence than current laboratory sources. Current laboratory scale sources are still based on rotating anode tubes working on the physical basis of the original tube invented by Roentgen more than 100 years ago. Such applications are phase contrast imaging to increase the spatial resolution in medical imaging and sensitivity to soft tissues, which only provide index contrast rather than an absorption change. Phase contrast imaging allows for micron level screening of the body, which is important to address artefacts in plague detection in vessels during cardio-vascular diagnosis. The quasi-monochromatic output enables a much lower dose to patients. The size of this source makes it fit to hospital installations. Other applications are various X-ray scattering techniques for material analysis. The high brightness and small spot size of the source, when compared to rotating anode tube sources, enable nm-scale resolution.

The features of the invention disclosed in the above description, the drawing and the claims can be of significance both individually as well as in combination or sub-combination for the realization of the invention in its various embodiments.

What is claimed is:

1. An X-ray pulse source, being configured for generating X-ray pulses, comprising:
    an electron pulse source device comprising a photo-emitter device being configured for photo-induced creation of free electron pulses and a driver device being configured for creating electromagnetic driver pulses accelerating the electron pulses along an acceleration path, and
    an electromagnetic interaction device comprising an electromagnetic pulse source device being configured for creating electromagnetic pulses in an interaction section of the electromagnetic interaction device, wherein
    the electron pulse source device and the electromagnetic interaction device are operable for generating the X-ray pulses by an interaction of the electron pulses and the electromagnetic pulses, and
    the driver device includes a THz driver pulse source, which is configured for creating THz driver pulses.

2. The X-ray pulse source according to claim 1, wherein the photo-emitter device comprises a field emitter array and a laser source arranged for irradiating the field emitter array with excitation pulses.

3. The X-ray pulse source according to claim 2, wherein the laser source and the field emitter array are configured for creating temporarily modulated electron pulses.

4. The X-ray pulse source according to claim 1, wherein the THz driver pulse source comprises at least one of the features
    the THz driver pulse source is coupled via a THz driver waveguide with the acceleration path, and
    the THz driver pulse source includes multiple source stages each being configured for creating the THz driver pulses.

5. The X-ray pulse source according to claim 1, further comprising
    an accelerator device being arranged between the electron pulse source device and the electromagnetic interaction device and comprising at least one THz accelerator pulse source, wherein the accelerator device is arranged for additionally accelerating the electron pulses along the acceleration path.

6. The X-ray pulse source according to claim 1, comprising at least one of
    a compressor device being arranged between the electron pulse source device and the electromagnetic interaction device for temporarily compressing the electron pulses traveling along the acceleration path, and
    a focusing device being arranged between the electron pulse source device and the electromagnetic interaction device for focusing the electron pulses to the interaction section of the optical interaction device.

7. The X-ray pulse source according to claim 6, wherein the electron pulse source device and the electromagnetic pulse source device are operable such that the interaction of the electron pulses and the electromagnetic pulses is a coherent interaction, wherein the electromagnetic pulses provide an undulator field in the interaction section.

8. The X-ray pulse source according to claim 1, wherein the electron pulse source device and the electromagnetic pulse source device are operable such that the interaction of the electron pulses and the electromagnetic pulses is an incoherent interaction comprising an inverse Compton scattering.

9. A method of creating X-ray pulses, comprising the steps of
    photo-induced generating of electron pulses and accelerating the electron pulses along an acceleration path by the effect of electromagnetic driver pulses, and
    creating the X-ray pulses by an interaction of the electron pulses and electromagnetic pulses, wherein
    the driver pulses comprise THz driver pulses.

10. The method according to claim 9, wherein the electron pulses are generated by optical field emission.

11. The method according to claim 9, further comprising at least one of the steps of
    the THz driver pulses are coupled via a THz driver waveguide with the acceleration path, and
    the THz driver pulses are generated with multiple source stages each being configured for creating the THz driver pulses.

12. The method according to claim 9, further comprising additionally accelerating the electron pulses along the acceleration path.

13. The method according to claim 9, further comprising at least one of
    temporarily compressing the electron pulses traveling along the acceleration path, and
    focusing the electron pulses to an interaction section.

14. The method according to claim 9, wherein the interaction of the electron pulses and the electromagnetic pulses is a coherent interaction, wherein the electromagnetic pulses provide an undulator field.

15. The method according to claim 9, wherein the interaction of the electron pulses and the electromagnetic pulses is an incoherent interaction comprising inverse Compton scattering.

* * * * *